(12) United States Patent
Cen (10) Patent No.: US 11,712,882 B2
(45) Date of Patent: Aug. 1, 2023

(54) DISASSEMBLING DEVICE

(71) Applicant: TRIPLE WIN TECHNOLOGY(SHENZHEN) CO.LTD., Shenzhen (CN)

(72) Inventor: Feng Cen, Shenzhen (CN)

(73) Assignee: TRIPLE WIN TECHNOLOGY(SHENZHEN) CO.LTD., Shenzhen (CN)

(*) Notice: Subject to any disclaimer, the term of this patent is extended or adjusted under 35 U.S.C. 154(b) by 0 days.

(21) Appl. No.: 17/565,399

(22) Filed: Dec. 29, 2021

(65) Prior Publication Data

US 2022/0242105 A1 Aug. 4, 2022

(30) Foreign Application Priority Data

Feb. 2, 2021 (CN) .......................... 202120300198.0

(51) Int. Cl.
*B32B 43/00* (2006.01)
*B32B 41/00* (2006.01)

(52) U.S. Cl.
CPC ............ *B32B 43/006* (2013.01); *B32B 41/00* (2013.01); *B32B 2457/00* (2013.01); *Y10S 156/922* (2013.01); *Y10S 156/924* (2013.01); *Y10S 156/937* (2013.01); *Y10T 156/1132* (2015.01); *Y10T 156/1153* (2015.01); *Y10T 156/1911* (2015.01); *Y10T 156/1944* (2015.01)

(58) Field of Classification Search
CPC ............ B32B 43/006; Y10T 156/1132; Y10T 156/1153; Y10T 156/1911; Y10T 156/1944
See application file for complete search history.

(56) References Cited

U.S. PATENT DOCUMENTS

| 9,330,898 | B2* | 5/2016 | Hirakawa | H01L 21/02076 |
| 9,962,920 | B2* | 5/2018 | Yang | B32B 38/1858 |
| 2011/0048630 | A1* | 3/2011 | Hase | H01L 21/67132 156/941 |
| 2014/0103022 | A1* | 4/2014 | Teck | G02F 1/1309 83/870 |
| 2015/0217557 | A1* | 8/2015 | Lee | B32B 43/006 156/707 |
| 2021/0249290 | A1* | 8/2021 | Sen | H01L 21/681 |

* cited by examiner

*Primary Examiner* — Philip C Tucker
*Assistant Examiner* — Nickolas R Harm
(74) *Attorney, Agent, or Firm* — ScienBiziP, P.C.

(57) ABSTRACT

A disassembling device facilitating a gentle disassembly of components glued together includes a base, a heating plate, a moving member, and a vacuum suction assembly. The disassembling device disassembles and separates portions of an electronic device for post-manufacture analysis or other purposes. The electronic device can disassemble glued parts with speed and high efficiency. By applying suction and sufficient heating to glued-together portions of the electronic device, damages to the electronic device can be avoided.

8 Claims, 7 Drawing Sheets

DISASSEMBLING DEVICE

FIELD

The subject matter herein generally relates to disassembling tools, and more particularly, to a disassembling device.

BACKGROUND

During a manufacturing process of electronic devices (such as mobile phones, cameras, etc.), defective products may be produced. Such defective products need to be disassembled and analyzed. An existing disassembling method is to manually disassemble the defective products by a tweezer or a blade. However, the disassembling method is inefficient, and may cause further damages such as scratches, deformation which may hinder a fault analysis.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 1:
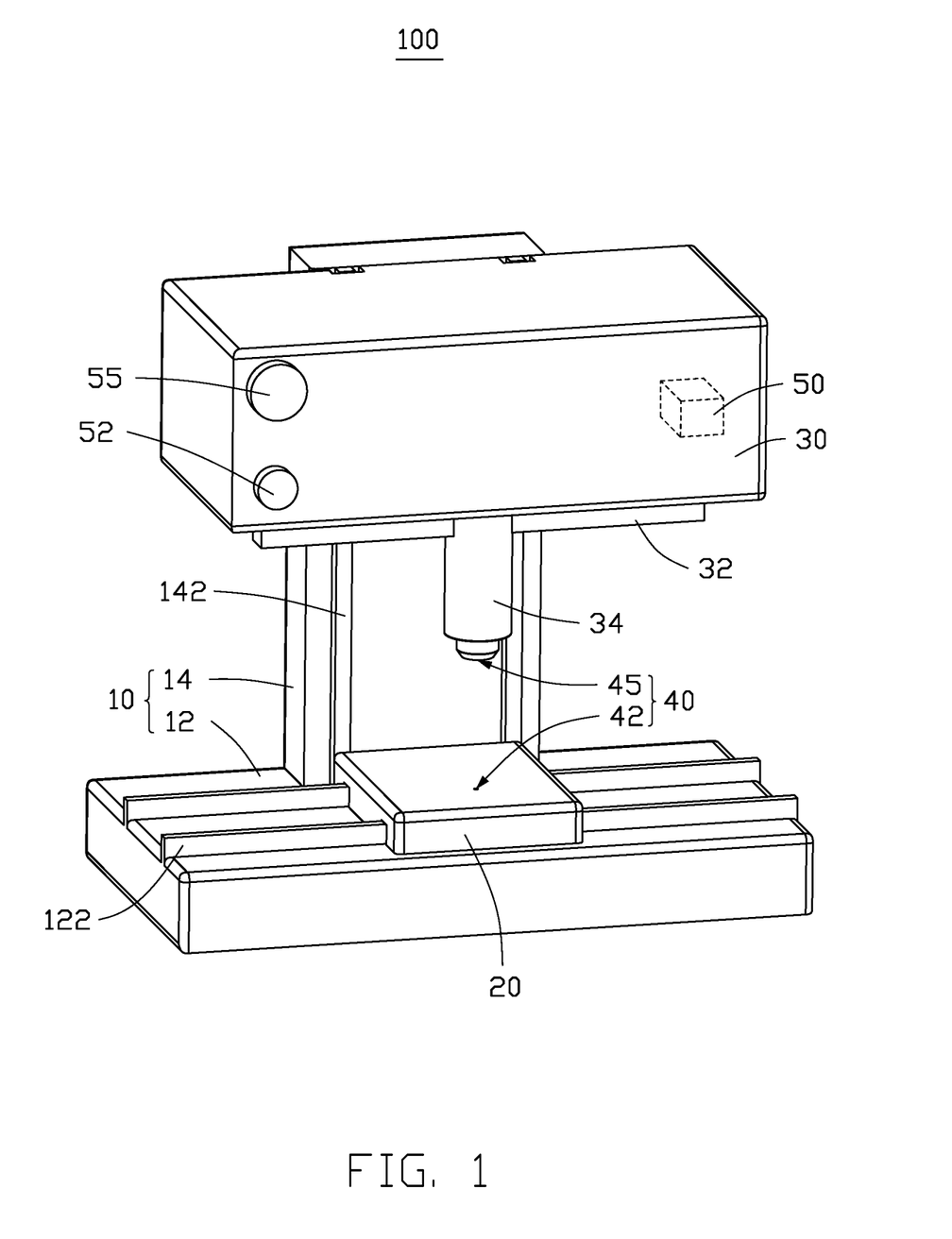
FIG. 1 is a diagrammatic view of an embodiment of a disassembling device according to the present disclosure.
Figure 2:
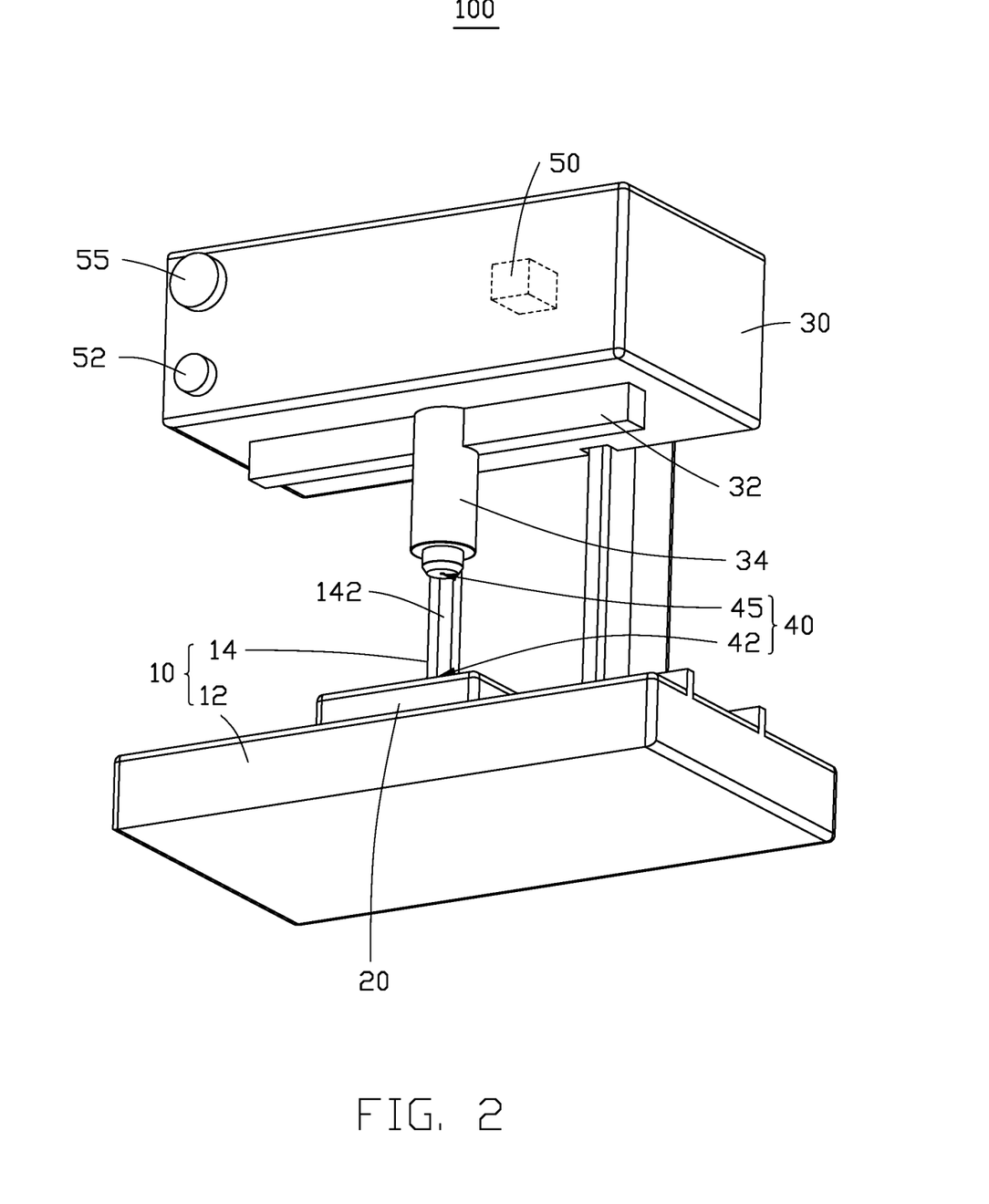
FIG. 2 is similar to FIG. 1, but showing the disassembling device from another angle.
Figure 3:
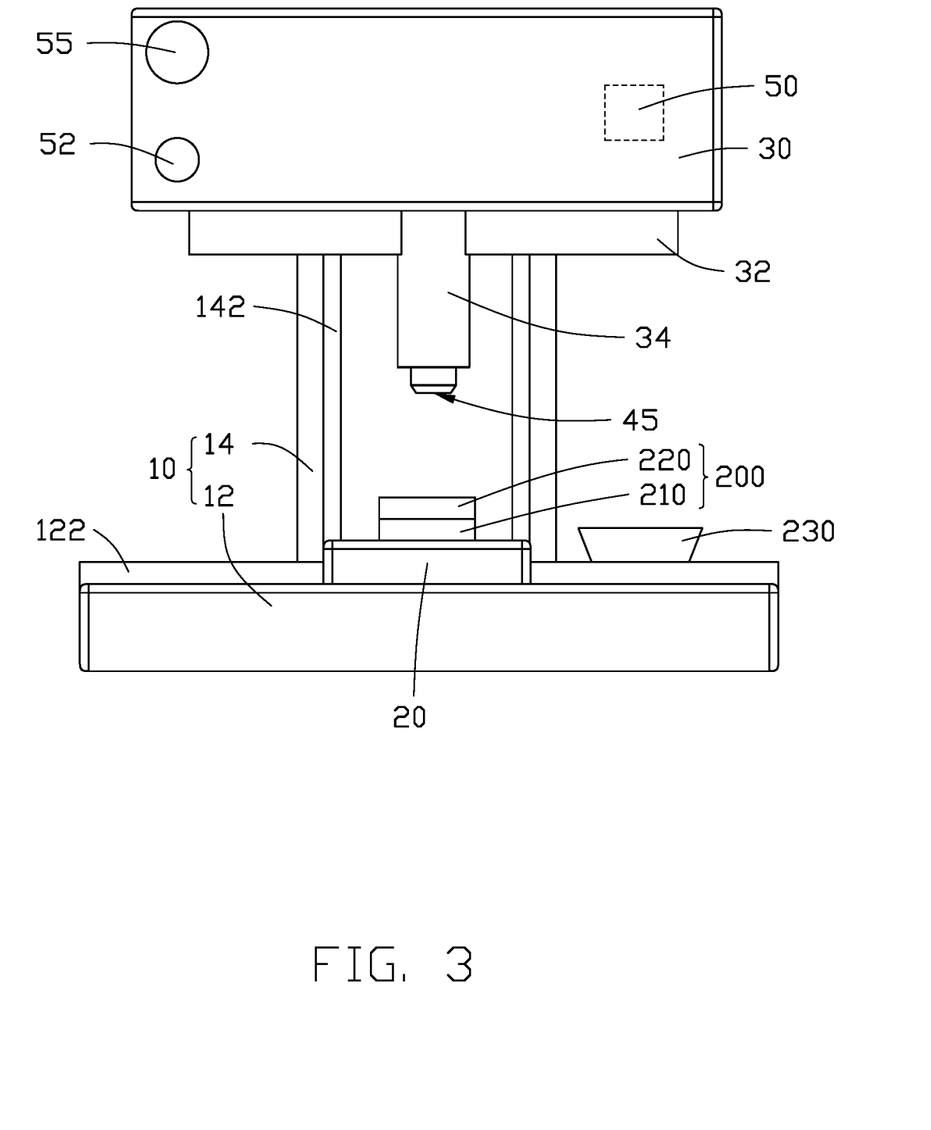
FIG. 3 is a diagrammatic view showing an electronic device placed on a heating plate of the disassembling device of FIG. 1.

Referring to FIGS. 1 to 2, an embodiment of a disassembling device 100 is provided. The disassembling device 100 can be used for disassembling an electronic device 200 as shown in FIG. 3. The electronic device 200 may include a mobile phone, a camera, and the like. In the embodiment, the electronic device 200 is a camera. The camera includes a first portion 210 and a second portion 220. The first portion 210 may be a base of the camera, and the second portion 220 may be an optical filter of the camera. The first portion 210 and the second portion 220 are glued together. The disassembling device 100 separates the first portion 210 from the second portion 220.

The disassembling device 100 includes a base 10, a heating plate 20, a moving member 30, and a vacuum suction assembly 40. The base 10 supports the heating plate 20. The heating plate 20 supports the electronic device 200. When the electronic device 200 is placed on the heating plate 20, the first portion 210 is connected to the heating plate 20, and the heating plate 20 heats the electronic device 200. The moving member 30 is movably disposed on the base 10 and faces the second portion 220. The vacuum suction assembly 40 penetrates the heating plate 20 and the moving member 30. The vacuum suction assembly 40 attracts the first portion 210 through the heating plate 20, and attracts the second portion 220 through the moving member 30. The moving member 30 then moves in a direction away from the heating plate 20 to separate the first portion 210 from the second portion 220.

The base 10 includes a first fixing portion 12 and a second fixing portion 14 fixed together. The base 10 formed by the first fixing portion 12 and the second fixing portion 14 is substantially L-shaped. The first fixing portion 12 supports the heating plate 20, and the second fixing portion 14 supports the moving member 30.

The heating plate 20 is fixed to a surface of the first fixing portion 12 facing the second fixing portion 14. The heating plate 20 supports and heats the electronic device 200, so that the glue in the electronic device 200 is softened, thereby facilitating disassembly of the electronic device 200.

A heating temperature of the heating plate 20 can be set according to a temperature that the first portion 210 and the second portion 220 can withstand or depending on the type of the glue. In some embodiments, the heating temperature of the heating plate 20 may be between 50 degrees Celsius and 300 degrees Celsius.

The moving member 30 is movably disposed on the second fixing portion 14 and protrudes from the second fixing portion 14. The moving member 30 and the heating plate 20 are disposed on the same side of the second fixing portion 14. The moving member 30 can move toward or away from the heating plate 20.

In some embodiments, the disassembling device 100 further includes a second guiding rail 142. The second guiding rail 142 is disposed on the second fixing portion 14, and is perpendicular to a plane where the heating plate 20 is disposed. The moving member 30 is disposed on the second guiding rail 142, and can move along the second guiding rail 142 toward or away from the heating plate 20.

In some embodiments, the disassembling device 100 further includes a third guiding rail 122. The third guiding rail 122 is disposed on a surface of the first fixing portion 12 facing the second fixing portion 14. The third guiding rail 122 is used to limit a movement of the heating plate 20 along an extension direction of the third guiding rail 122, thereby adjusting a position of the electronic device 200 relative to the moving member 30. At the same time, the third guiding rail 122 facilitates the placement of the electronic device 200, and also facilitates the removal of the first portion 210 after disassembly.

The vacuum suction assembly 40 includes a first suction hole 42 and a second suction hole 45. The first suction hole 42 is disposed on a surface of the heating plate 20 facing the moving member 30. The first suction hole 42 allows suction on the first portion 210 of the electronic device 200 on the heating plate 20. The second suction hole 45 is disposed on a surface of the moving member 30 facing the heating plate 20. The second suction hole 45 allows suction on the second portion 220 of the electronic device 200 away from the heating plate 20.

The relative position between the moving member 30 and the heating plate 20 can be adjusted according to the movement of the heating plate 20 along the second guiding rail 142, so as to adjust the relative position between the second suction hole 45 and the first suction hole 42.

In some embodiments, the moving member 30 includes a suction nozzle 34. The suction nozzle 34 is disposed on the surface of the moving member 30 facing the heating plate 20. The second suction hole 45 penetrates the suction nozzle 34, and is exposed to the surface of the suction nozzle 34 facing the heating plate 20, to facilitate suction applied to the electronic device 200.

In some embodiments, the disassembling device 100 further includes a controller 50. The controller 50 is electrically connected to the moving member 30 for controlling a working state and a moving direction of the moving member 30 along the second guiding rail 142. For example, the controller 50 controls the moving member 30 to move toward or away from the heating plate 20 along the second guiding rail 142.

The controller 50 is further electrically connected to the vacuum suction assembly 40 for controlling a working state of the vacuum suction assembly 40. For example, the controller 50 controls when the vacuum suction assembly 40 starts to work and when the vacuum suction assembly 40 stops working.

The controller 50 is further electrically connected to the heating plate 20, and control the temperature of the heating plate 20 to be heated.

In some embodiments, the disassembling device 100 further includes a start button 52 and a stop button 55. The start button 52 and the stop button 55 are electrically connected to the controller 50. The start button 52 and the stop button 55 can be disposed on the base 10 or on the moving member 30. In the embodiment, the start button 52 and the stop button 55 are both disposed on the moving member 30.

The start button 52 is used to start the moving member 30 and the vacuum suction assembly 40 working. The stop button 55 switches off the disassembling device 100 after being operated, that is, the disassembling device 100 is put in a stopped state.

In some embodiments, the disassembling device 100 further includes a first guiding rail 32. The first guiding rail 32 is disposed on the surface of the moving member 30 facing the heating plate 20. The first guiding rail 32 penetrates the suction nozzle 34. The suction nozzle 34 can be moved along the first guiding rail 32 under the control of the controller 50. For example, in some embodiments, after the first portion 210 is separated from the second portion 220, the suction nozzle 34 applies suction to the second portion 220 and moves to a specific position along the first guiding rail 32, and places the disassembled second portion 220 in a tray 230. In other embodiments, after the first portion 210 is separated from the second portion 220, the heating plate 20 applies suction to the first portion 210 and moves to a specific position along the third guiding rail 122, and the disassembled second portion 220 being placed in a tray 230.

A process of disassembling the electronic device 200 by the disassembling device 100 is as follows.

Referring to FIG. 3, the electronic device 200 is placed on the heating plate 20. The first portion 210 is connected to the heating plate 20, and the surface of the first portion 210 covers the first suction hole 42. The second portion 220 is disposed on a side of the first portion 210 facing the suction nozzle 34. A switch for controlling the heating of the heating plate 20 is turned on, and the heating plate 20 heats the electronic device 200, so that the glue between the first portion 210 and the second portion 220 is softened.

Figure 4:
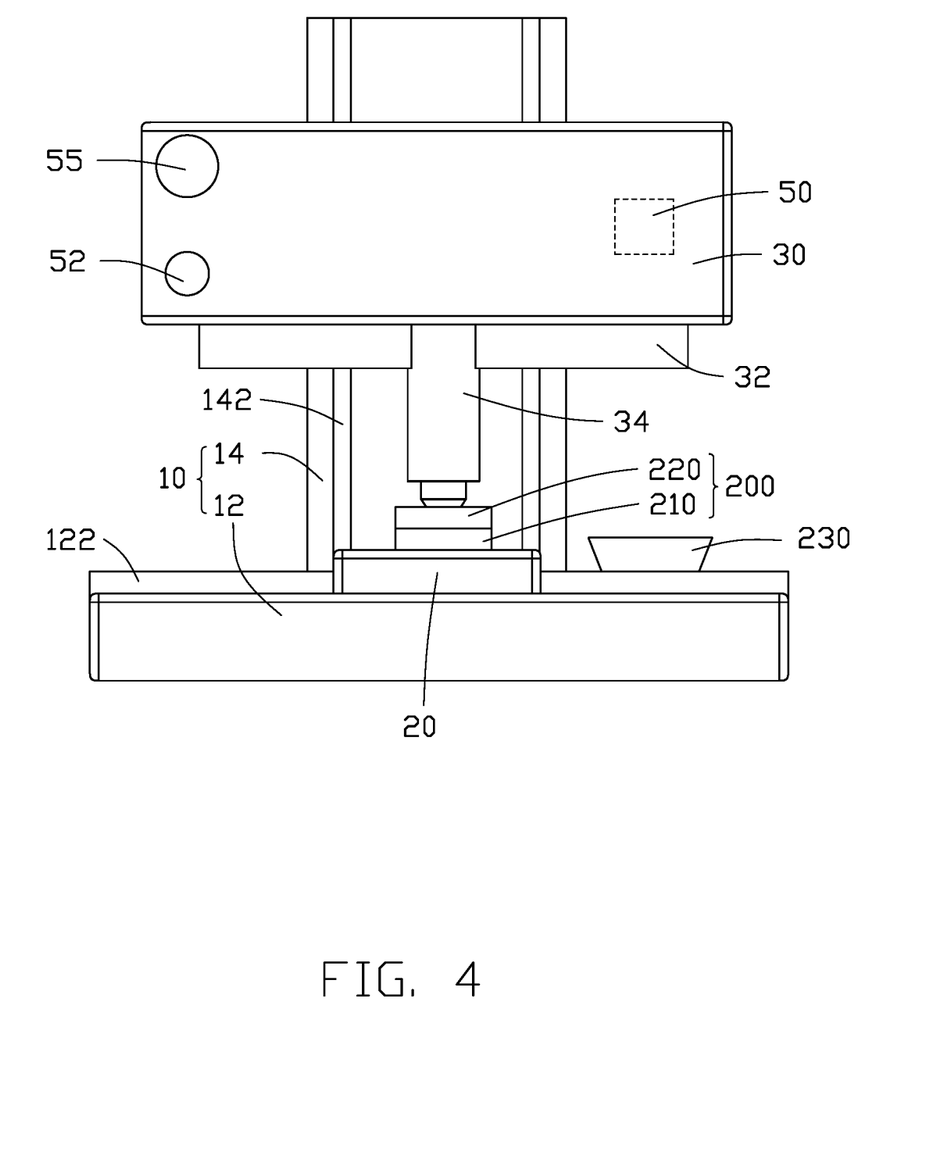
FIG. 4 is a diagrammatic view showing a moving member of the disassembling device of FIG. 3 moving toward the electronic device.

Referring to FIG. 4, after the heating is completed, the start button 52 is pressed. The moving member 30 moves along the second guiding rail 142 toward the heating plate 20 until the suction nozzle 34 contacts the second portion 220 of the electronic device 200, and the moving member 30 stops moving. At this time, the second suction hole 45 is connected to the second portion 220.

After the moving member 30 stops moving, the vacuum suction assembly 40 creates a vacuum. The first suction hole 42 suctions the first portion 210 of the electronic device 200 because of the vacuum, and the second suction hole 45 suctions the second portion 220 of the electronic device 200 because of the vacuum.

Figure 5:
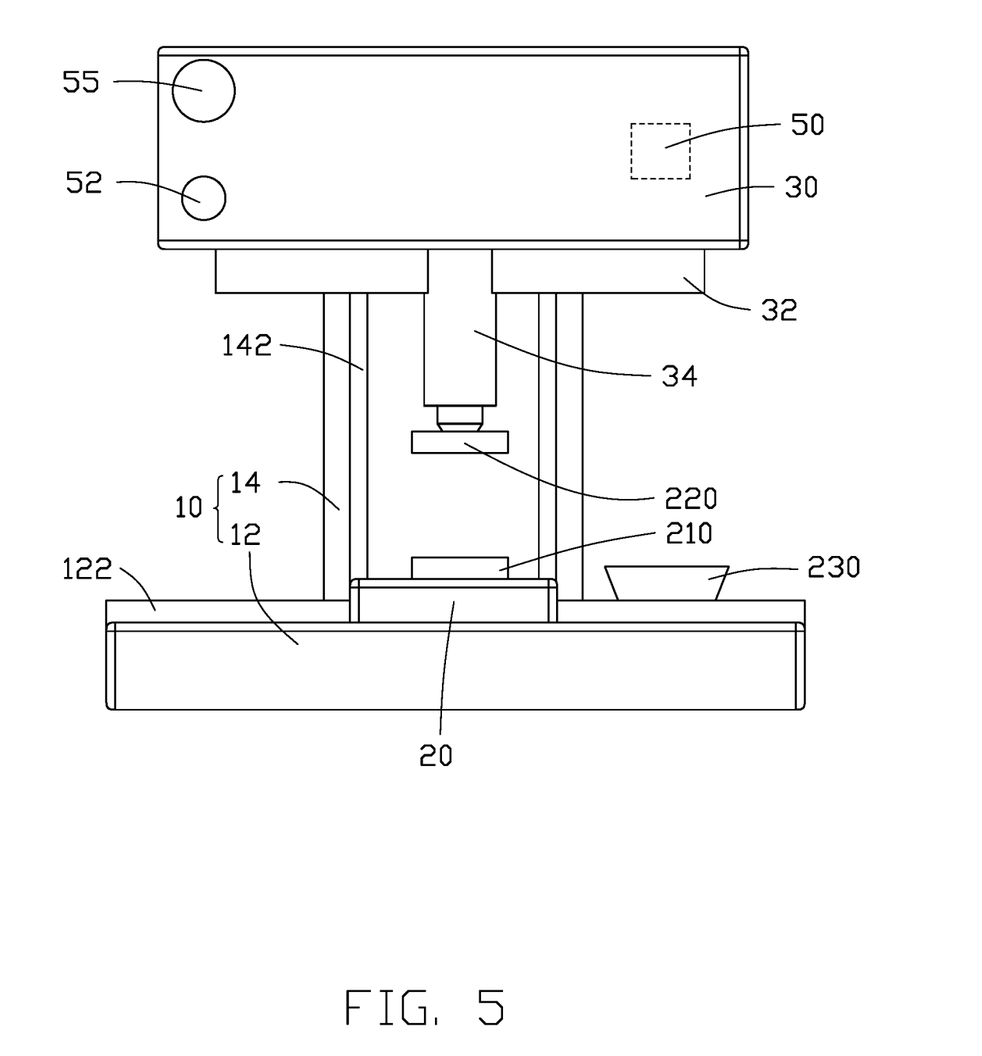
FIG. 5 is a diagrammatic view showing a second portion of the electronic device separated from a first portion by the moving member of FIG. 4.

Referring to FIG. 5, the start button 52 is pressed again, and the moving member 30 starts to drive the suction nozzle 34 to move away from the heating plate 20. Due to the adsorption effect of the first suction hole 42 and the second suction hole 45, the second suction hole 45 moves away from the first suction hole 42. When the force of the moving member 30 facing away from the first suction hole 42 is greater than a bonding force between the first portion 210 and the second portion 220, the first portion 210 and the second portion 220 are separated. After the first portion 210 and the second portion 220 are separated, the moving member 30 drives the suction nozzle 34 to continue to move along the second guiding rail 142.

Figure 6:
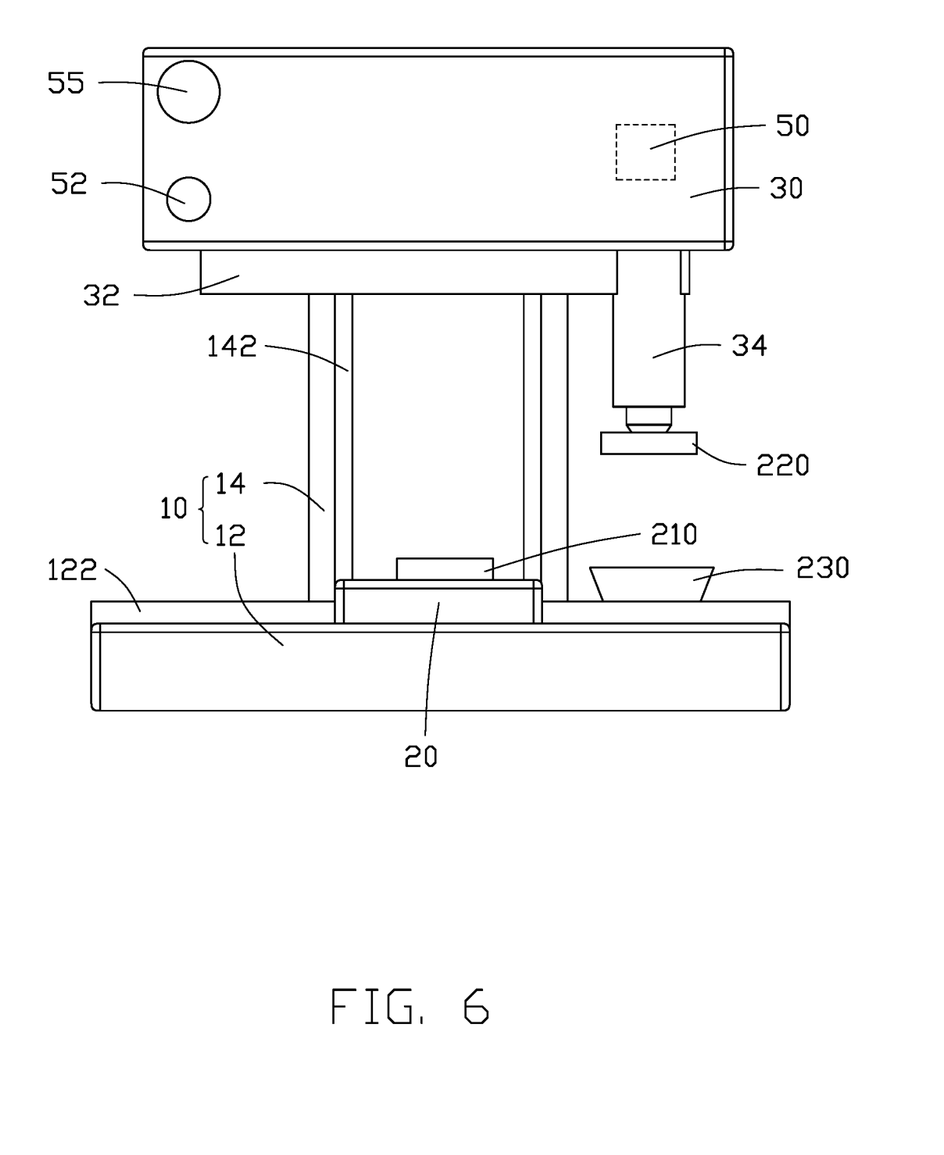
FIG. 6 is a diagrammatic view showing the second portion moved towards to a tray by the moving member of FIG. 5.

Referring to FIG. 6, in some embodiments, the suction nozzle 34 carries the separated second portion 220 and moves along the first guiding rail 32 to a specific position (for example, above a tray 230), the vacuum suction assembly 40 stops working, and the second portion 220 is dropped into the tray 230 under the loss of suction force and the action of gravity.

Figure 7:
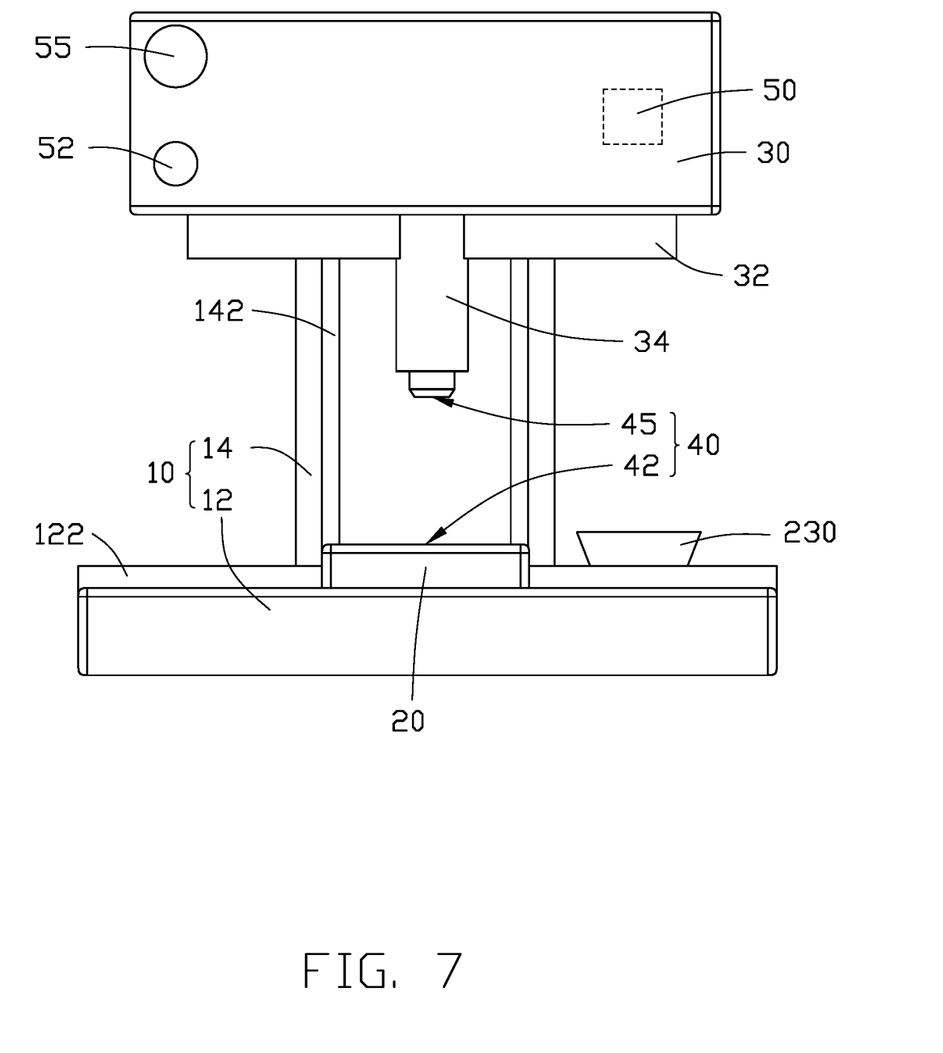
FIG. 7 is a diagrammatic view showing the moving member of FIG. 6 returned to an initial position.

Referring to FIG. 7, after the vacuum suction assembly 40 stops working, the suction nozzle 34 returns to an initial position along the first guiding rail 32.

The disassembling device 100 provided in the present disclosure, through a mutual cooperation of the base 10, the heating plate 20, the moving member 30, and the vacuum adsorption assembly 40, the electronic device 200 can be easily and cleanly disassembled with minimal risk of breakage of the electronic device 200, with fast disassembly speed and high efficiency. The suction applied to the parts of the electronic device 200 by the vacuum suction assembly 40 is no stronger than it needs to be, and damage to the electronic device 200 can be avoided.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A disassembling device comprising:
a base comprising a first fixing portion and a second fixing portion fixed to the first fixing portion;
a heating plate fixed to a surface of the first fixing portion facing the second fixing portion;
a moving member movably disposed on the second fixing portion, and configured to move toward or away from the heating plate, the moving member comprising a suction nozzle facing the heating plate;
a first guiding rail disposed on a surface of the moving member facing the heating plate, and the first guiding rail is configured to limit a movement direction of the suction nozzle; and
a vacuum suction assembly comprising a first suction hole and a second suction hole, wherein the first suction hole is on the heating plate, the second suction hole is on the moving member;
wherein the second suction hole penetrates the suction nozzle, and is exposed to a surface of the suction nozzle facing the heating plate; the disassembling device is configured to disassemble an electronic device which comprises a first portion and a second portion, the heating plate is configured to support and heat the electronic device, the first suction hole is configured to suction the first portion, the second suction hole is configured to suction the second portion, the moving member is configured to move away from the heating plate to separate the first portion from the second portion.

2. The disassembling device of claim 1, wherein the disassembling device comprises a controller electrically connected to the moving member, and is configured to control a working state and a moving direction of the moving member.

3. The disassembling device of claim 2, wherein the controller is further electrically connected to the vacuum suction assembly, and is further configured to control a working state of the vacuum suction assembly.

4. The disassembling device of claim 3, wherein the disassembling device further comprises a start button electrically connected to the controller.

5. The disassembling device of claim 3, wherein the disassembling device further comprises a stop button electrically connected to the controller.

6. The disassembling device of claim 1, wherein the disassembling device further comprises a second guiding rail disposed on the second fixing portion, and is perpendicular to a plane where the heating plate is disposed, and the second rail is configured to limit a movement direction of the moving member.

7. The disassembling device of claim 6, wherein the disassembling device further comprises a third guiding rail disposed on the first fixing portion facing the second fixing portion, and the third guiding rail is configured to limit a movement direction of the heating plate.

8. The disassembling device of claim 1, wherein a heating temperature of the heating plate is 50 degrees Celsius to 300 degrees Celsius.

* * * * *